United States Patent
Gilmore et al.

(10) Patent No.: US 9,772,625 B2
(45) Date of Patent: Sep. 26, 2017

(54) MODEL REFERENCED MANAGEMENT AND CONTROL OF A WORKSITE

(71) Applicant: Deere & Company, Moline, IL (US)

(72) Inventors: Brian J. Gilmore, Geneseo, IL (US); Craig E. Wenzel, Chicago, IL (US); Kerry J. Morvant, Thibodaux, LA (US); Timothy S. Hunt, Davenport, IA (US); Jan M. Wyckoff, Sycamore, IL (US); Vickie L. Ellis, Milan, IL (US)

(73) Assignee: Deere & Company, Moline, IL (US)

(*) Notice: Subject to any disclaimer, the term of this patent is extended or adjusted under 35 U.S.C. 154(b) by 532 days.

(21) Appl. No.: 14/275,374

(22) Filed: May 12, 2014

(65) Prior Publication Data

US 2015/0324719 A1    Nov. 12, 2015

(51) Int. Cl.
| | |
|---|---|
| *G06Q 10/10* | (2012.01) |
| *G05B 19/418* | (2006.01) |
| *G06Q 10/06* | (2012.01) |
| *G05B 15/02* | (2006.01) |

(52) U.S. Cl.
CPC ......... *G05B 19/4189* (2013.01); *G05B 15/02* (2013.01); *G05B 19/41885* (2013.01); *G06Q 10/06* (2013.01); *G06Q 10/067* (2013.01); *G06Q 10/06312* (2013.01); *Y02P 90/26* (2015.11); *Y02P 90/28* (2015.11)

(58) Field of Classification Search
CPC .. G06Q 10/00; G06Q 40/00; G06Q 10/06312; G06Q 10/06; G06F 17/60
USPC ...................................................... 705/7.22
See application file for complete search history.

(56) References Cited

U.S. PATENT DOCUMENTS

| | | | |
|---|---|---|---|
| 5,404,661 A | * | 4/1995 | Sahm ............... E02F 3/427 37/347 |
| 5,493,494 A | * | 2/1996 | Henderson ........ E01C 19/004 340/988 |
| 5,646,844 A | | 7/1997 | Gudat et al. |
| 5,712,782 A | | 1/1998 | Weigelt et al. |
| 5,897,595 A | | 4/1999 | Hawkins et al. |
| 5,902,343 A | | 5/1999 | Hale et al. |
| 5,931,875 A | | 8/1999 | Kemner et al. |
| 5,974,348 A | | 10/1999 | Rocks |
| 5,991,687 A | | 11/1999 | Hale et al. |

(Continued)

FOREIGN PATENT DOCUMENTS

| | | |
|---|---|---|
| CN | 101806905 A | 8/2010 |
| CN | 101897260 A | 12/2010 |

(Continued)

OTHER PUBLICATIONS

European Search Report EP151638004.4-1802 dated Nov. 11, 2015, 7 pages.

(Continued)

*Primary Examiner* — Romain Jeanty
(74) *Attorney, Agent, or Firm* — Joseph R. Kelly; Kelly, Holt & Christenson, PLLC

(57) ABSTRACT

A reference model generates a model output indicative of modeled operations of one or more worksites. The model output is compared against actual operation data indicative of actual worksite operations. A recommendation engine generates recommendations to adjust the worksite operations so that they more closely conform to the model operations.

3 Claims, 12 Drawing Sheets

(56) References Cited

U.S. PATENT DOCUMENTS

| | | |
|---|---|---|
| 5,995,894 A | 11/1999 | Wendte |
| 5,995,895 A | 11/1999 | Watt et al. |
| 6,029,106 A | 2/2000 | Hale et al. |
| 6,085,135 A | 7/2000 | Steckel |
| 6,128,574 A | 10/2000 | Diekhans |
| 6,141,614 A | 10/2000 | Janzen et al. |
| 6,205,381 B1 | 3/2001 | Motz et al. |
| 6,216,071 B1 | 4/2001 | Motz |
| 6,236,924 B1 | 5/2001 | Motz et al. |
| 6,327,569 B1 | 12/2001 | Reep |
| 6,803,854 B1 | 10/2004 | Adams et al. |
| 9,423,332 B2 * | 8/2016 | Corcoran ............... G01N 9/36 |
| 2002/0082757 A1 | 6/2002 | Behnke |
| 2003/0069680 A1 | 4/2003 | Cohen et al. |
| 2003/0229435 A1 | 12/2003 | van der Lely |
| 2004/0004544 A1 | 1/2004 | Knutson |
| 2004/0021563 A1 | 2/2004 | Mahoney et al. |
| 2004/0073468 A1 | 4/2004 | Vyas et al. |
| 2005/0125247 A1 | 6/2005 | Ding et al. |
| 2005/0197175 A1 | 9/2005 | Anderson |
| 2005/0273253 A1 | 12/2005 | Diekhans et al. |
| 2005/0284119 A1 | 12/2005 | Brunnert |
| 2006/0014489 A1 | 1/2006 | Fitzner et al. |
| 2006/0047377 A1 | 3/2006 | Ferguson et al. |
| 2006/0058896 A1 | 3/2006 | Pokorny et al. |
| 2006/0155449 A1 | 7/2006 | Dammann |
| 2006/0178825 A1 | 8/2006 | Eglington et al. |
| 2006/0196158 A1 | 9/2006 | Faivre et al. |
| 2006/0200294 A1 | 9/2006 | Scheufler et al. |
| 2006/0271262 A1 | 11/2006 | McLain |
| 2007/0005209 A1 | 1/2007 | Fitzner et al. |
| 2007/0073700 A1 | 3/2007 | Wippersteg et al. |
| 2007/0089390 A1 | 4/2007 | Hendrickson et al. |
| 2007/0129869 A1 | 6/2007 | Gudat et al. |
| 2007/0135190 A1 | 6/2007 | Diekhans et al. |
| 2007/0233348 A1 | 10/2007 | Diekhans et al. |
| 2007/0233374 A1 | 10/2007 | Diekhans et al. |
| 2007/0268852 A1 | 11/2007 | Stegmaier et al. |
| 2007/0282523 A1 | 12/2007 | Diekhans et al. |
| 2007/0298744 A1 | 12/2007 | Fitzner et al. |
| 2008/0059007 A1 | 3/2008 | Whittaker et al. |
| 2008/0098035 A1 | 4/2008 | Wippersteg et al. |
| 2008/0140431 A1 | 6/2008 | Anderson et al. |
| 2008/0208415 A1 | 8/2008 | Vik |
| 2009/0037059 A1 | 2/2009 | Huster et al. |
| 2009/0082949 A1 | 3/2009 | Petrie et al. |
| 2009/0099707 A1 | 4/2009 | Greiner et al. |
| 2009/0192654 A1 | 7/2009 | Wendte et al. |
| 2009/0216410 A1 | 8/2009 | Allen et al. |
| 2009/0222160 A1 | 9/2009 | Morselli et al. |
| 2009/0222186 A1 | 9/2009 | Jensen |
| 2009/0278839 A1 | 11/2009 | Geis et al. |
| 2009/0299555 A1 | 12/2009 | Houpt et al. |
| 2009/0312919 A1 | 12/2009 | Foster et al. |
| 2010/0042297 A1 | 2/2010 | Foster et al. |
| 2010/0063651 A1 | 3/2010 | Anderson |
| 2010/0063673 A1 | 3/2010 | Anderson |
| 2010/0070144 A1 | 3/2010 | Burke et al. |
| 2010/0070145 A1 | 3/2010 | Foster et al. |
| 2010/0094459 A1 | 4/2010 | Cho et al. |
| 2010/0094481 A1 | 4/2010 | Anderson |
| 2010/0145572 A1 | 6/2010 | Steckel et al. |
| 2010/0191361 A1 | 7/2010 | McCready et al. |
| 2010/0274452 A1 | 10/2010 | Ringwald et al. |
| 2010/0326746 A1 | 12/2010 | Kraus |
| 2011/0072773 A1 | 3/2011 | Schroeder et al. |
| 2011/0084851 A1 | 4/2011 | Peterson et al. |
| 2011/0112730 A1 | 5/2011 | Rekow |
| 2011/0142099 A1 | 6/2011 | Poncelet born Morey |
| 2011/0153143 A1 | 6/2011 | O'Neil et al. |
| 2011/0160994 A1 | 6/2011 | Schmidt et al. |
| 2011/0205084 A1 | 8/2011 | Morselli et al. |
| 2011/0213531 A1 | 9/2011 | Farley et al. |
| 2011/0227745 A1 | 9/2011 | Kikuchi et al. |
| 2011/0257850 A1 | 10/2011 | Reeve et al. |
| 2011/0295460 A1 | 12/2011 | Hunt et al. |
| 2012/0095651 A1 | 4/2012 | Anderson |
| 2012/0143642 A1 | 6/2012 | O'Neil |
| 2012/0200697 A1 | 8/2012 | Wuestefeld et al. |
| 2012/0215378 A1 | 8/2012 | Sprock et al. |
| 2012/0215379 A1 | 8/2012 | Sprock et al. |
| 2012/0253709 A1 | 10/2012 | Schmidt et al. |
| 2012/0256760 A1 | 10/2012 | Johnson et al. |
| 2012/0259537 A1 | 10/2012 | Schmidt et al. |
| 2012/0265412 A1 | 10/2012 | Diekhans et al. |
| 2012/0271489 A1 | 10/2012 | Roberts et al. |
| 2013/0046525 A1 | 2/2013 | Ali et al. |

FOREIGN PATENT DOCUMENTS

| | | |
|---|---|---|
| CN | 102298366 A | 12/2011 |
| CN | 102854851 A | 1/2013 |
| DE | 19705842 A1 | 8/1998 |
| DE | 10050224 A1 | 4/2002 |
| DE | 102008021785 A1 | 11/2009 |
| EP | 0761084 A1 | 3/1997 |
| EP | 1560141 A2 | 8/2005 |
| EP | 2146307 A2 | 1/2010 |
| EP | 2186389 A1 | 5/2010 |
| EP | 2353353 A1 | 8/2011 |
| EP | 2530630 A1 | 12/2012 |
| WO | WO0215673 A1 | 2/2002 |
| WO | 2008074008 | 6/2008 |
| WO | 2008074008 A2 | 6/2008 |
| WO | WO2012041621 | 4/2012 |
| WO | WO2012110508 A1 | 8/2012 |
| WO | WO2012112205 A1 | 8/2012 |

OTHER PUBLICATIONS

U.S. Appl. No. 14/275,354, Office Action dated Apr. 21, 2017, 9 pages.

European Search Report 15163799.8-1870/2963512 dated Jun. 15, 2016. 10 pages.

* cited by examiner ns in the same field, or in a different field. When the trailer truck reaches a desired capacity, it is transported to a larger storage or processing area, such as a sugarcane mill. After unloading the crop, the trailer truck travels to its previous location, or to a new location, to receive additional crop loads from the billet wagons.

MODEL REFERENCED MANAGEMENT AND CONTROL OF A WORKSITE

RELATED APPLICATION

The present application is related to U.S. application Ser. No. 14/275,364, entitled COMMUNICATION SYSTEM FOR CLOSED LOOP CONTROL OF A WORKSITE, filed on May 12, 2013, now pending and assigned to the same assignee as the present case.

FIELD OF THE DESCRIPTION

The present description relates to managing and controlling a worksite. More specifically, the present description relates to managing and controlling a worksite using a reference model, in a closed loop control system.

BACKGROUND

Many worksite operations have relatively complicated logistic systems associated with them. Such worksite operations can include, for instance, construction site operations, forestry operations, and agricultural operations. In some cases, a single manager or organization is in charge of managing and controlling multiple different worksites. For instance, a construction manager may be in charge of controlling the logistics and other aspects of multiple different construction sites at the same time. In addition, a forestry organization or company may be harvesting at multiple different worksites. Further, an agricultural company or farm manager may be in charge of managing and controlling operations at multiple different worksites (such as multiple different fields that are harvesting simultaneously). A manager may attempt to monitor and coordinate the operations of a plurality of different vehicles utilized at each worksite or at multiple different worksites, simultaneously.

One example of an operation that has relatively complicated logistics is a sugarcane production operation. A conventional sugarcane mill may accept harvested sugarcane from multiple different fields surrounding the mill, in order to maintain a constant rate of production through the mill. The distances from the fields to the mill may be, for instance, on the order of 25 kilometers. A representative set of sugarcane harvesting equipment may include, for example, 15 harvesters, 30 tractors, 60 wagons, and 7 highway trucks. A plurality of different sugarcane harvesters (say, for example, 3 harvesters) may be harvesting sugarcane from a single field.

The harvesting process includes cutting the cane at the base, stripping the leaves, cutting the cane stalks into usable "billets", and depositing the billets into a tractor-drawn billet wagon that travels alongside the harvester. When the billet wagon reaches a desired capacity, the harvester may stop the harvesting process to allow the full billet wagon to depart, and a second tractor-drawn billet wagon to be positioned alongside the harvester to receive the harvested crop. The full billet wagon is transported to a larger capacity trailer truck and the crop is transferred from the billet wagon to the trailer truck. The billet wagon then travels to a location where it is ready to position itself to receive billets from one of the working harvesters in the field.

The trailer truck either remains at its location to receive additional crop from other billet wagons, or it may travel to another location to receive additional crop from billet wagons in the same field, or in a different field. When the trailer Some operations of this type have a field manager that coordinates the vehicle logistics. The field manager attempts to maintain communication with the sugarcane mill, the cane harvesters, and all of the various transferring vehicle operators to determine current vehicle locations, vehicle status and resource needs. Transfer vehicles, such as billet wagons and trailer trucks, are directed to locations based upon actual or anticipated harvester locations. Additionally, the field manager attempts to use as few vehicles as are necessary, with minimal operator downtime.

The field manager thus considers a great deal of logistical information in order to properly coordinate the resources of the operation. The field manager's task is often further complicated because some factors (such as machine capabilities, geographical terrain and mill demand) may mean that the field manager must use multiple different communication systems to coordinate the operational activities.

The operations are often on-going for relatively long periods of time at relatively high volumes. For instance, sugarcane harvest may last for approximately 200 days (as an example) and process cane at a rate of 7500 tons of sugarcane per day for a typical mill.

The discussion above is merely provided for general background information and is not intended to be used as an aid in determining the scope of the claimed subject matter.

SUMMARY

A reference model generates a model output indicative of modeled operations of one or more worksites. The model output is compared against actual operation data indicative of actual worksite operations. A recommendation engine generates recommendations to adjust the worksite operations so that they more closely conform to the model operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present discussion can be applied in a wide variety of different environments. For instance, it can be applied in a forestry environment, in a construction environment, in an industrial agricultural environment, or in other environments. Each of the environments may have one or more worksites where operational and logistical management and control is desired. The present discussion proceeds with respect to an industrial agricultural environment, but this is described by way of example only. The specific example discussed is a sugarcane harvesting operation. Again, this is only one specific example of an industrial agricultural operation, and the present discussion could be applied to others as well.

Figure 1:
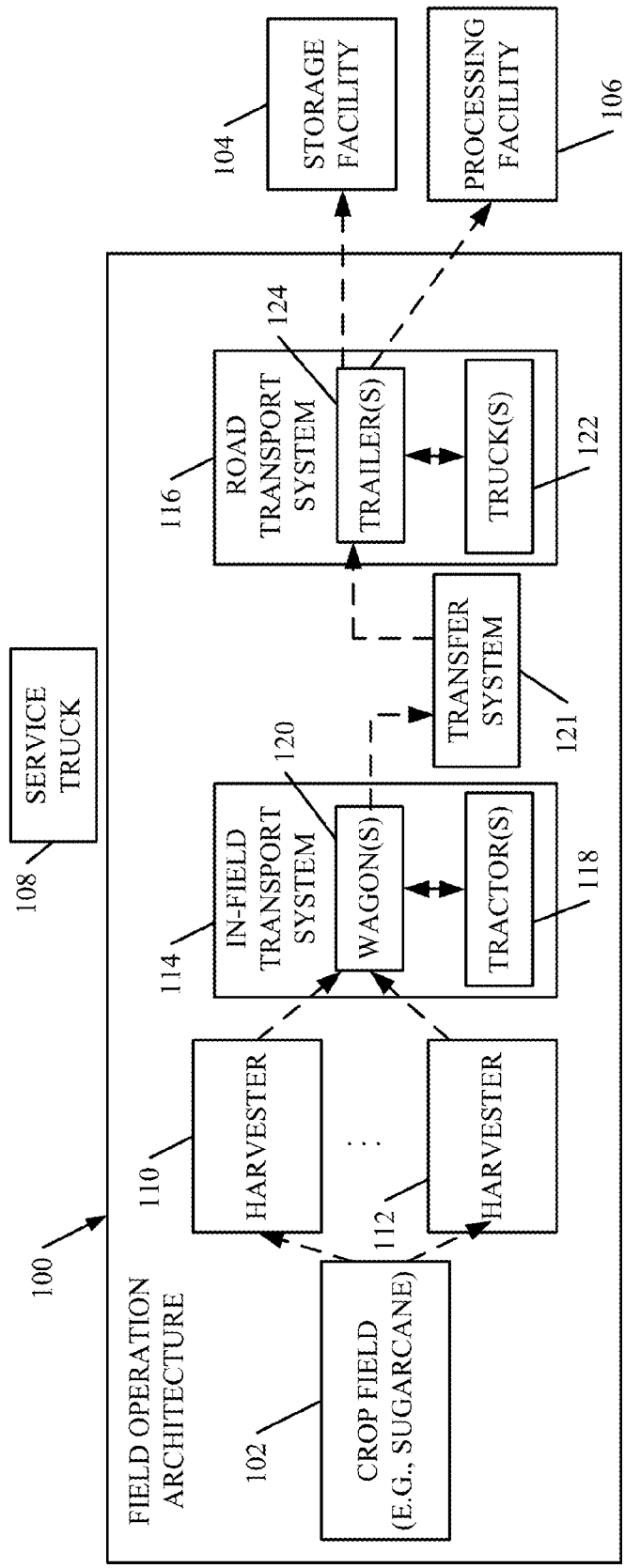
FIG. 1 is a block diagram of one illustrative operations architecture in an industrial agriculture environment.

FIG. 1 is a block diagram of one embodiment of a field operation architecture 100, in which sugarcane is being harvested from field 102. The dashed arrows shown in FIG. 1 illustrate product (e.g., harvested sugarcane) flow through architecture 100 to either a storage facility 104 or a processing facility 106 (such as a sugarcane mill). FIG. 1 also shows that architecture 100 has an associated service truck 108 that, as is described in greater detail below, includes not only a communication system for providing closed loop communication for the architecture 100, storage facility 104 and processing facility 106, but it also includes a management and control system for managing and controlling the operations and logistics of the overall operation.

In the example shown in FIG. 1, field operation architecture 100 includes a plurality of systems. For instance, a harvesting system includes a plurality of harvesters 110-112. While only two harvesters are shown, it will be appreciated that a single harvester or more harvesters, can be used. Harvesters 110 and 112 illustratively harvest sugarcane from field 102. Architecture 100 also includes in-field transport system 114, transfer system 121 and road transport system 116. The harvested sugarcane is transmitted from harvesters 110-112 by in-field transport system 114. In one embodiment, system 114 includes one or more tractors 118 that pull one or more associated billet wagons 120. The tractors 118 move wagons 120 into position relative to harvesters 110-112 so that they can be filled, as harvesters 110-112 are harvesting. When a given wagon 120 is full, it's associated tractor 118 moves it toward the road transport system 116. The billets are transferred to the road transport system 116 by transfer system 121. The road transport system 116 takes the load to either storage facility 104 or processing facility 106.

In the embodiment illustrated, road transport system 116 illustratively includes one or more trucks 122 that pull one or more associated trailers 124. Each trailer 124 illustratively has a capacity to hold sugarcane billets from a plurality of different wagons 120. When a given trailer 124 reaches its desired capacity, its associated truck 122 takes it, over the road, to the designated storage facility 104 or processing facility 106. The sugarcane billets are weighed and unloaded at the desired facility. They are then processed through that facility.

Figure 2:
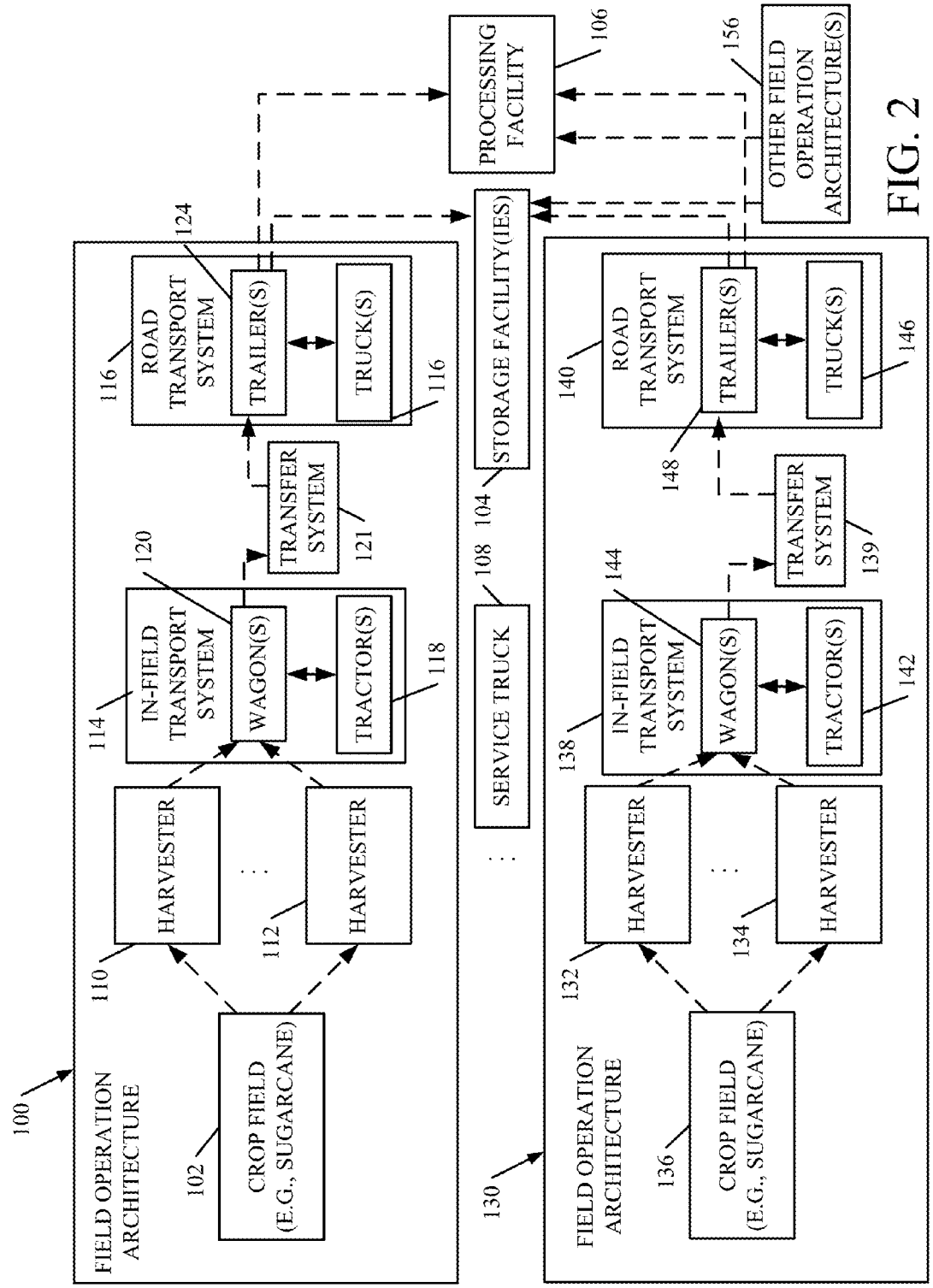
FIG. 2 is another embodiment of an operations architecture, which includes a plurality of different worksites, in an industrial agricultural environment.

FIG. 2 shows another embodiment that includes both field operation architecture 100 and one or more additional field operation architectures 130 and 156. The embodiment shown in FIG. 2 illustrates that even some industrial agricultural operations (e.g., a single sugarcane operation) can include a plurality of worksites. A sugarcane operation, for instance, can include multiple worksites. Each worksite can have an associated field operation architecture that harvests sugarcane from a given field.

Thus, architecture 100 is the same as that shown in FIG. 1, and similar items are similarly numbered. However, in the industrial agricultural operation shown in FIG. 2, the same manager may be in charge of controlling not only the operations in architecture 100, but the operations in architectures 130 and 156 as well. Architecture 130 shows that a plurality of different harvesters 132-134 are harvesting sugarcane from another sugarcane field 136. As with operation architecture 100, architecture 130 also includes an in-field transport system 138, a transfer system 139 and a road transport system 140. Each in-field transport system 138 includes one or more tractors 142 that pull one or more associated billet wagons 144. Road transport system 140 includes one or more trucks 146 that pull one or more corresponding trailers 148. Architecture 156 may be the same as, or different from, architectures 100 and 130.

In the embodiment shown in FIG. 2, a single service truck 108 includes the communication systems that are used to close the communication loop between all of the entities in the embodiment shown in FIG. 2. Service truck 108 also includes the management and control systems to manage and control logistics and other aspects of the overall agricultural operation depicted in FIG. 2.

Figure 3:
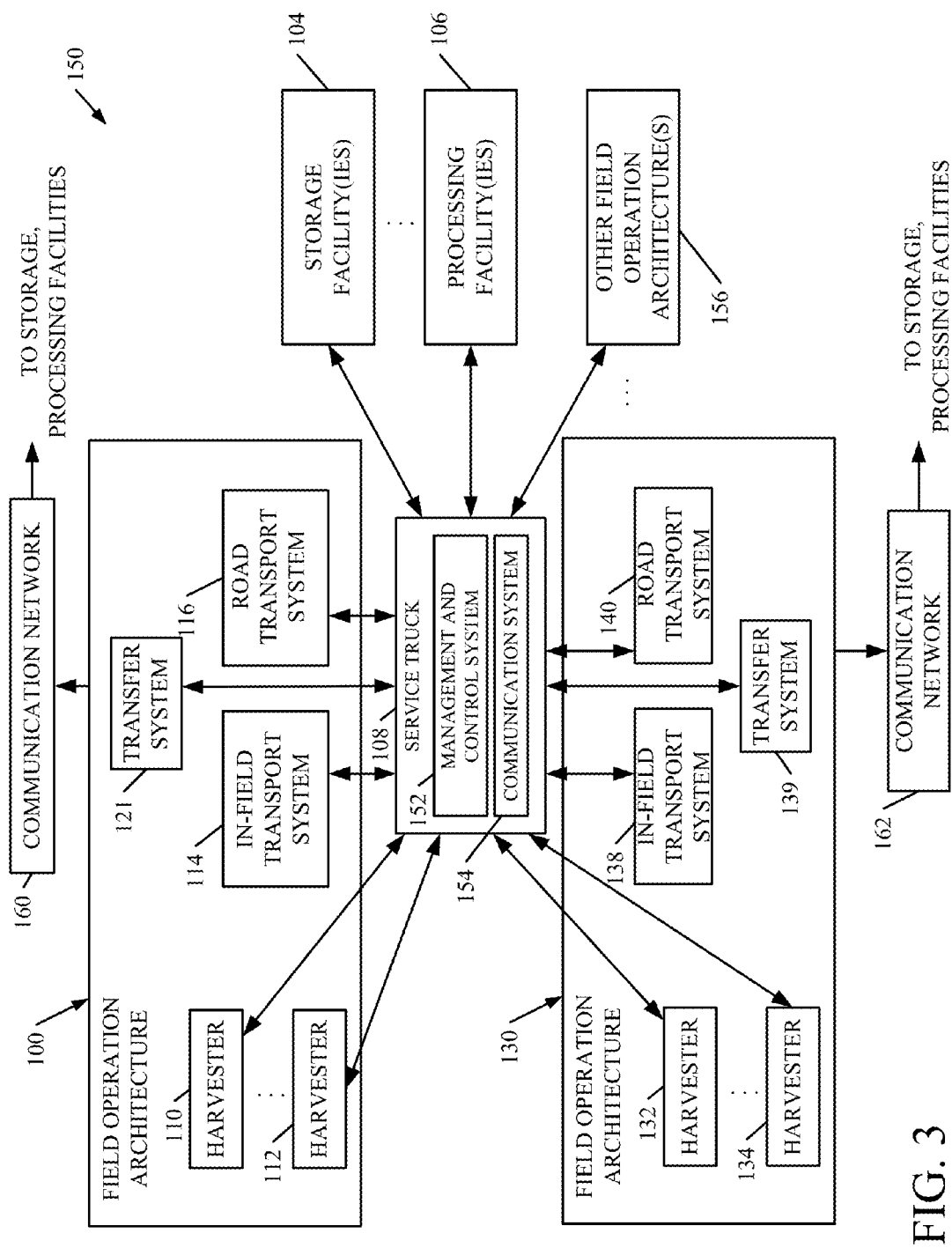
FIG. 3 is a block diagram of a management and control architecture for the operations architecture shown in FIG. 2.

FIG. 3 is a block diagram of one illustrative management and control architecture 150, deployed in the industrial architectural operation depicted in FIG. 2. Some of the items shown in architecture 150 are similar to those shown in FIG. 2, and they are similarly numbered. Architecture 150 is shown to indicate how personnel in service truck 108 can use management and control system 152, and communication system 154 to perform management and control operations for the overall industrial agricultural operation depicted in FIG. 2. Thus, architecture 150 includes field operation architecture 100, field operation architecture 130, and it can include other field operation architectures 156 as well.

In the embodiment shown in FIG. 3, service truck 108 is illustratively positioned to establish a multi-band communications network. The network illustratively has geographical coverage that includes all of the field operation architectures 100, 130 and 156 for the fields to be harvested, as well as the storage facilities 104 and processing facilities 106 that receive the harvested crop, and the connecting fields and roadways that are available for use by the in-field transport vehicles and the road transport vehicles.

Figure 3A:
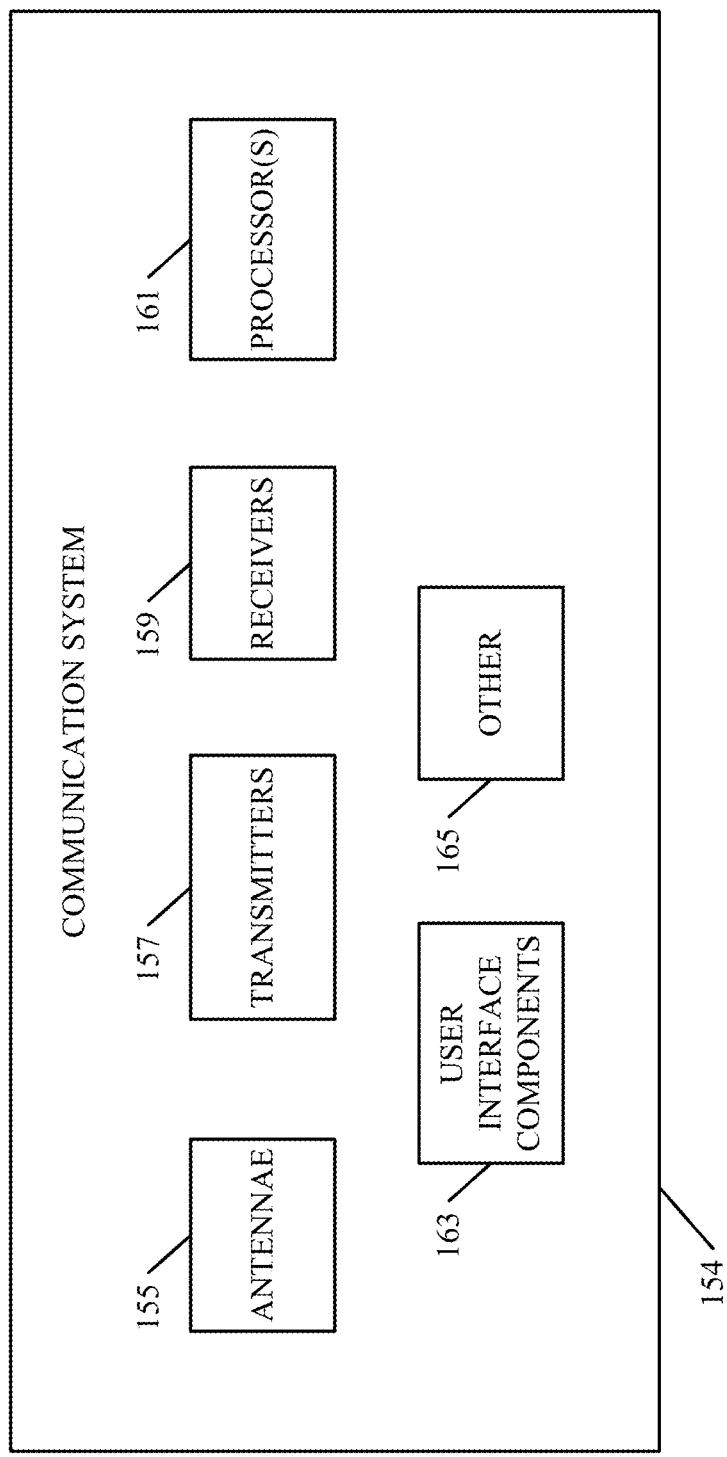
FIG. 3A is a block diagram of one embodiment of a communication system.

Communication system 154 is illustratively equipped with components that enable it to establish a telecommunications link and, when combined with management and control system 152, form a field operations command center. Some such components are shown in FIG. 3A. They may include, for instance, antennae 155, one or more transmitters 157 and receivers 159, processors 161, user interface components 163 and they can include other items 165 as well. For example, communication system 154 may include a digital broadcasting system within a combined spectrum signal in the 450 MHz range. This can be well suited for field activities spread over large acreage where cell phone coverage may not be sufficient, may be too expensive, or may not be sufficiently secure.

The items in each of the field operation architectures 100, 130 and 156 (e.g., the harvesters, tractors, trucks and/or trailers), as well as the storage facilities 104 and processing facilities 106, are also illustratively equipped with communication systems that include a data communications device and a user interface device. These devices use the communications network established by communication system 154 in service truck 108 to transmit data to the management and control system 152 in service truck 108. Each of the items in each of the field operation architectures 100, 130 and 156 illustratively provide operational data indicative of the operator and operation of the particular machine transmitting the data.

Management and control system 152 is described in greater detail below with respect to FIGS. 4 and 5. Briefly, however, it illustratively includes processors that process the received field operational data and generate recommended operator actions. The recommendations are illustratively transmitted to the machine operators using the communications network and user interfaces on the various machines.

By way of example, the management and control system 152 can receive a wide variety of different data from each crop harvester. For instance, it can include real-time (or near real-time) machine performance data, machine settings, ground speed, orientation, location and direction of travel, fuel consumption data, mass flow data, yield data, grain tank fill status, idle time data, data indicative of time waiting to unload, various transport times, data indicative of the time that a given piece of equipment is waiting in line at various points in the operations architecture, operator identifying data, operator performance data, among other things. By near real time, it is meant, in one example, the data is received and processed with only the time delay introduced by automated data processing or network transmission, between the occurrence of the event giving rise to the data and the use of the data, such as for display or feedback and control purposes.

Management and control system 152 can also receive information from the billet wagons or their associated tractors. This can include, for instance, real-time (or near real time) information such as location, heading, ground speed and wagon storage capacity, among others.

Further, system 152 can receive data from the trucks and corresponding trailers in the road transport systems. This can include, for instance, real-time (or near real time) information such as location, heading, ground speed and trailer crop storage capacity, among others.

It can receive information from the crop storage facilities or sugarcane mills as well. This can include, for instance, real-time (or near real time) information indicative of weighing station and unloading station availability, wait times, the length of queues, etc.

Further, it can receive data indicative of various operator inputs. This data can include, for instance, information regarding estimated machine down-time due to maintenance or repairs, estimations as to the idle time or time spent waiting in line or waiting for other assets within the operation. By way of example, it may include information indicative of the time spent by a given harvester waiting for an empty billet wagon to be brought to its location for unloading.

These are only examples of information that can be transmitted to management and control system 152. A wide variety of additional or different information could be used as well.

Management and control system 152 illustratively receives the information on a continuous or intermittent basis and processes it so that various components of the field operation can be directed to predicted locations based on the received information. For instance, directions can be given based on current vehicle operating parameters and the relative movements of the other vehicles. Additionally, field management and control system 152 can generate recommendations for adjustments to vehicle operating parameters and to other aspects of the operation based on the collected overall operations data. By way of example, a given crop harvester may be directed to operate at a reduced speed, to save fuel and increase yield, if a billet wagon is known to be delayed. As another example, a crop harvester may be directed to adjust its maintenance schedule due to billet wagon availability. In that way, the maintenance can be scheduled to occur when a billet wagon is unavailable, so that it occurs when the harvester would be idle anyway. Similarly, the routes and schedules of trucks and trailers taking the crop to a storage facility or a mill, can be adjusted to alleviate congestion at a given storage facility or mill. Processing delays at a crop storage facility or a mill can be monitored in real-time (or near real time) and appropriate adjustments can be made to the entire vehicle routing system. Again, these are only examples of the types of outputs that can be generated by management and control system 152.

It can thus be seen that by providing the service truck as a mobile field service center, in one embodiment, a closed communication loop among all of the systems in each of one, or a plurality, of field operation architectures 100, 130 and 156 is established. It can be established by a local, two-way communication system among the items in each operation architecture 100, 130 and 156 and a corresponding management and control system. It can also establish a communication system that communicates with storage and processing facilities. The communication systems can be general mobile radio systems (GMRS), wifi communication systems, or other systems (such as a 450 mHz system, with repeaters as needed). This allows management and control system 152 to provide closed loop management and control of all of the operations, in order to improve performance of the entire operation. By receiving information from all of the items in the overall operation, management and control system 152 can generate specific, actionable, outputs that manage logistics, overall operations, and even specific machine operations, in order to improve performance.

Management and control system 152 can include any desired type of multi-input controller. For example, a simulation-based controller can receive the inputs from items in multiple fields or at multiple sites, operating with non-ideal machines, and from operators that are in uncertain conditions (such as various terrain and weather, etc.). Management and control system 152 can simulate the multitude of operator controls, the multitude of machine-to-machine performance variances, and it can adjust in real-time (or near real time) to provide real-time instructions to achieve better operations at each individual worksite and for the overall operation.

The system 152 can generate a wide variety of different kinds of recommendations. The recommendations can consider the performance of individual machines. For instance, if one machine becomes underpowered, then management and control system 152 can indicate to speed up or slow other machines, depending on the performance objective. Examples of other recommendations are described below.

It will be noted that the communication architecture shown in FIG. 3 can be used with a wide variety of different types of management and control systems 152. FIG. 4 shows one embodiment of a management and control system 152 that can be used. Management and control system 152, shown in FIG. 4, illustratively includes an operations reference model 200, an error calculation component 202, and decision support system 204. It can include processor 206 and data store 208 as well. In one embodiment, system 152 also includes operations manager system 210 (that can be automatic, semiautomatic or manual). For instance, where manager 212 is in service truck 108, then management and control system 152 illustratively includes operations manager system 210 as well. However, where manager 212 is remote, then system 210 can be external to system 152. In one embodiment, operations manager system 210 provides a user interface output (such as a user interface display) with user input mechanisms that can be actuated by manager 212 in order to control and manipulate worksite operations 216 for one or more of the field operation architectures 100, 130 or 156 shown in FIG. 3. Before describing the operation of management and control system 152 in more detail, a brief overview will first be provided.

The field operation architectures 100, 130 or 156 that are being controlled are illustratively modeled and their operations are simulated by operations reference model 200. In one embodiment, model 200 is a discrete-event model or simulation tool. Model 200 is predictive in nature and illustratively generates one or more metrics 201, at its output, which are compared to actual operations data 218 indicative of the worksite operations of one or more of the field operation architectures 100, 130 or 156.

Error calculation component 202 determines the difference between the actual operations data 218 and that output 201 by model 200. Thus, the real-time systems at the worksites are synchronized with the simulated system in model 200. In one embodiment, this is done in near real-time, and in another embodiment, the comparison is stored in data store 208 for later playback. Model 200 generates the output 201 indicative of the productivity, performance and positions of the equipment, and a variety of other things (some of which are discussed below) as a function of time. The items (such as the harvesters, tractors, trucks and trailers) in the field operation architectures are equipped with location systems (such as GPS equipment) and a variety of other sensors (represented by sensors 220 in FIG. 4). Therefore, they can provide the actual operations data 218, which is indicative of production, performance, geospatial position, and a wide variety of other information, as a function of time. The actual data 218 can then be compared against the corresponding model outputs 201.

In one embodiment, reference model 200 operates on an exception basis. For instance, when the differences between the actual process as indicated by operations data 218 and the simulated process indicated by the data output 201 by model 200 meets a predefined threshold, then decision support system 204 can generate recommendations 222. Recommendations 222 can be provided (such as through user interface displays 214) to manager 212, alerting manager 212 that the actual performance has deviated outside of an acceptable range from the modeled performance. Manager 212 can then take steps to investigate the cause of the discrepancy and to provide management and control outputs 226 to make appropriate adjustments to increase production performance. At that point, model 200 is updated to reflect the management and control outputs 226 and processing continues. This can serve as the basis for automatic, closed loop control wherein equipment (such as the harvesters, tractors, trucks and trailers) are reallocated and production rates are adjusted based upon the error 228 relative to the modeled performance. The model 200 will also be updated with any disturbances 230 which may be input into any of the worksite operations 216. The disturbances, for instance, can include weather, interruptions for a variety of reasons, machine failures, among others. The disturbances can be sensed and automatically input into model 200, or they can be manually input, or they can be input using a combination of automatic sensing and manual observation.

Figure 5A:
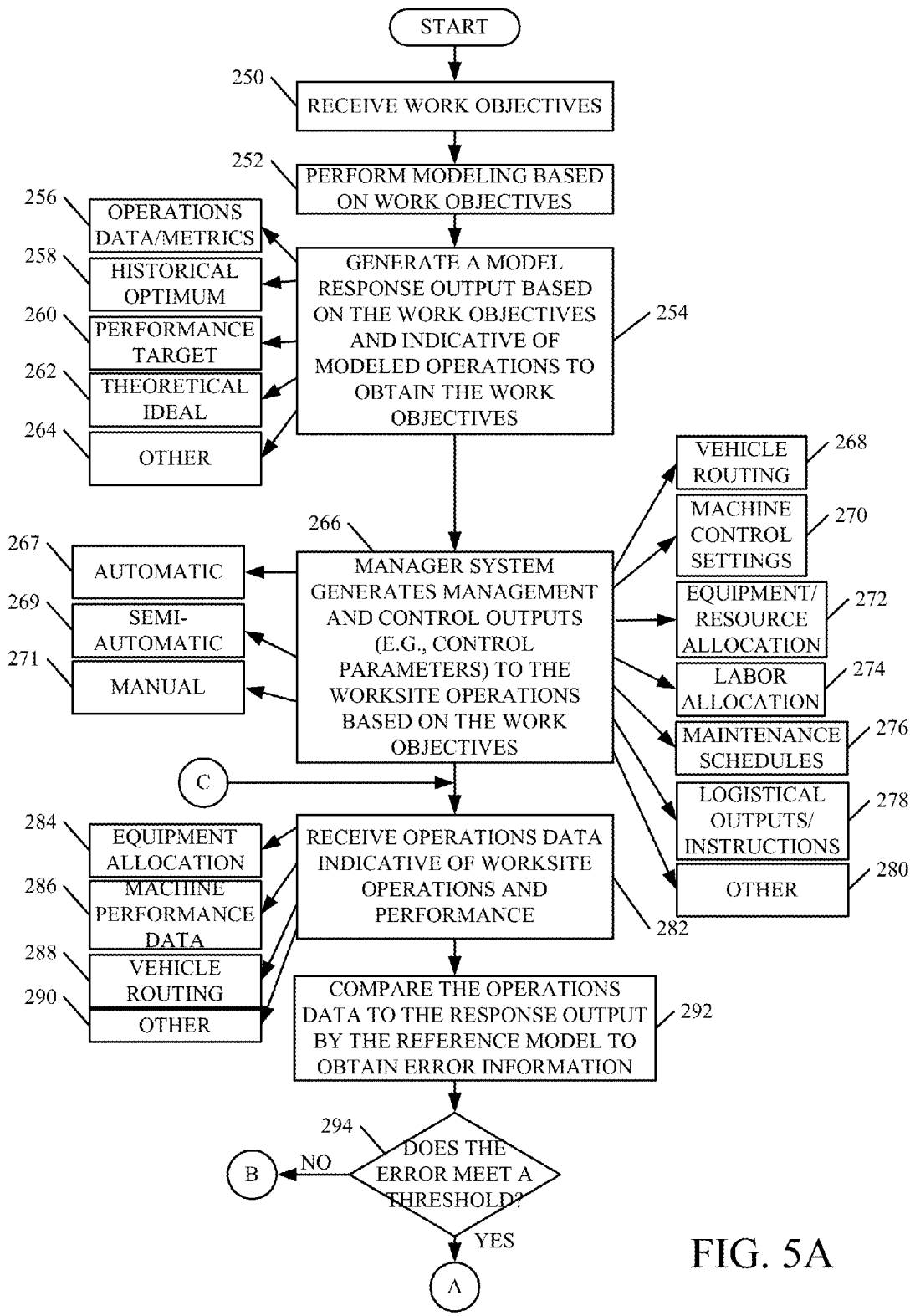
FIGS. 5A and 5B (collectively FIG. 5) show a flow diagram illustrating one embodiment of the operation of the management and control system shown in FIG. 4.
Figure 5B:
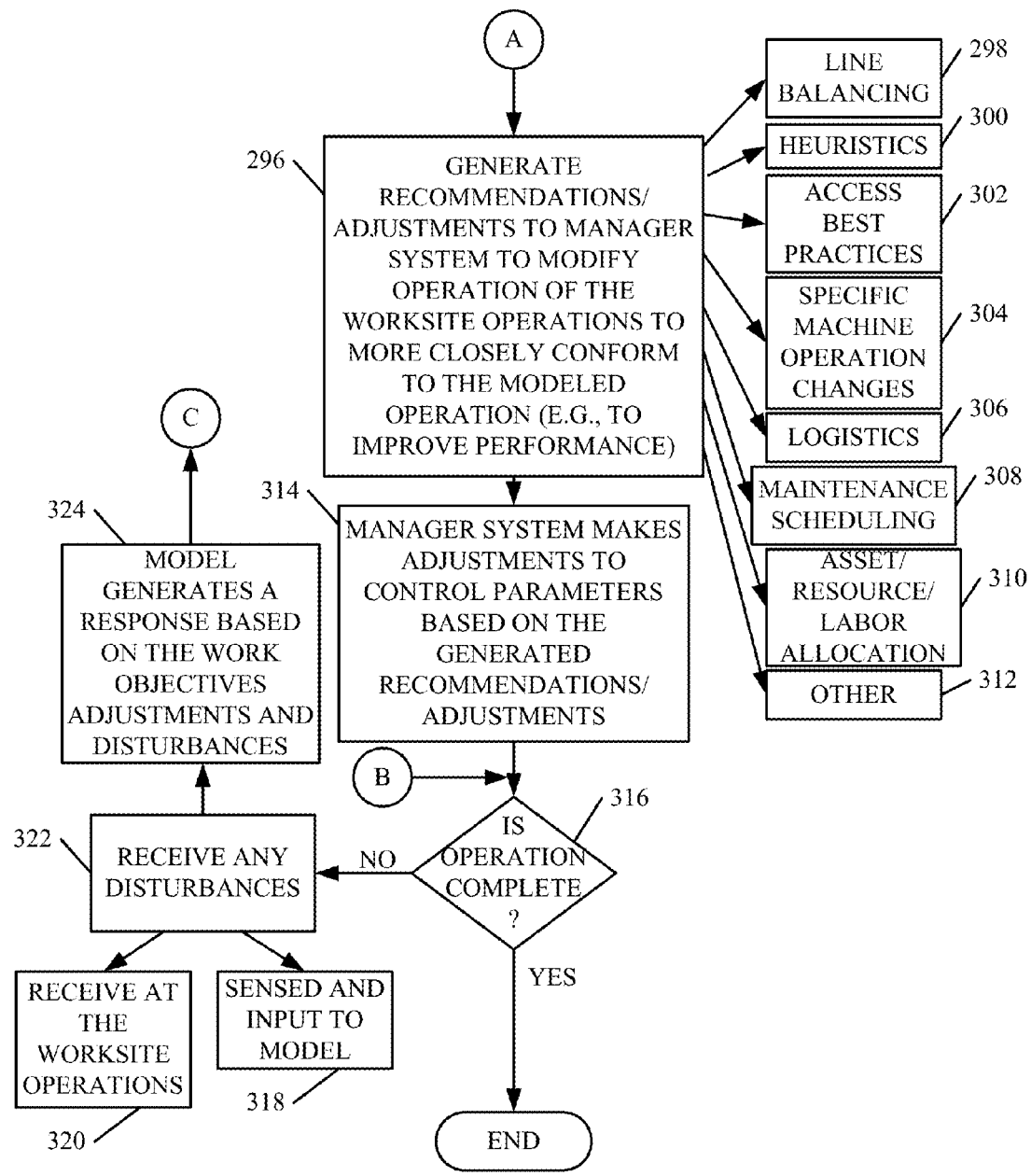

FIGS. 5A and 5B (collectively FIG. 5) show a flow diagram illustrating one embodiment of the operation of management and control system 152 in more detail. In one embodiment, reference model 200 first receives a set of work objectives 240. This is indicated by block 250 in FIG. 5. The work objectives can take a wide variety of different forms. For instance, they may be input by manager 212, or obtained from another source. As examples, the work objectives may be desired worksite outputs in terms of quantity of harvested material per unit time, or a performance goal or other things. The performance goal characterized by the worksite objectives may be, for instance, that the harvester never stops until the harvesting operation is complete. The worksite objectives may also be broken down into one or more objectives for the various components of the field operation architecture. For instance, there may be a worksite objective for the harvester in tons per hour. There may also be a worksite objective for the in-field transport system 114, the transfer system 121, the road transport system 116, the system that weighs the crop once it arrives at the mill, and for processing inside the mill. For these examples, the worksite objectives may be in terms of tons of harvested product per hour. Of course, other work objectives can be obtained as well.

Reference model 200 is then configured to model the overall architecture for which control is desired, if this has not already been done. For instance, the model will be configured to model and simulate operations for each of the field operation architectures being managed. This is indicated by block 252 in the flow diagram of FIG. 5.

Model 200 then generates a model response output based upon the work objectives and indicative of simulated operations to obtain the work objectives. This is indicated by block 254. The output generated by model 200 may be operations data or other metrics for the various machines being used. This is indicated by block 256. It can represent a historical optimum for the field operation architecture being modeled. This is indicated by block 258. It can include a performance or other target generated in other ways. This is indicated by block 260. It can represent the theoretical ideal 262 for the given field operation architecture. For instance, each machine in the field operation architecture may have a unique identifier identifying its capabilities and the particular features that it is configured with. The operators of the machines may also be identified. The theoretical ideal 262 can be generated using historical data for the given combination of machines and operators in the field operation architecture. Of course, the model response output can be generated in other ways 264 as well.

At the same time, operations manager system 210 generates the management and control outputs 226 to set the initial conditions under which the operation is to commence. For instance, the outputs may identify initial machine control settings for each of the machines in the operations architecture 270, initial equipment and resource allocations 272, initial labor allocations 274, initial maintenance schedules 276, and initial logistical outputs and instructions for vehicle routing 278. The initial set of instructions or control outputs can include other information 280 as well. Operation at the worksite or worksites then commences.

The various sensors 220 in the different pieces of equipment in the various field operation architectures generate the actual operations data 218 indicative of worksite performance. That operations data is received by management and control system 152 using a communication system, such as that described above with respect to FIGS. 1-3. Receiving the operations data indicative of worksite operations and performance is indicated by block 282 in FIG. 5.

As briefly mentioned above, the information can include equipment allocation information (such as the position of the various machines in the operations architecture). This is indicated by block 284. It can include specific machine performance data and settings sensed and transmitted on a machine controller area network (CAN) bus, or other machine performance data as indicated by block 286. It can include sensed vehicle routing information indicative of the actual routes being taken by the machines. This is indicated by block 288. It can include a host of other information as well, as indicated by block 290.

Error calculation component 202 compares the operations data 218 to the response output by the reference model 200 to obtain a difference (or, error information) 228. This is indicated by block 292. The comparisons can include a wide variety of different types of comparisons. Some examples include a comparison of the actual percentage of each field harvested at a given time versus the predicted percentage. It can also include the actual number of trucks in queue at each field at a given time versus the predicted number, the actual number of trucks in queue at each mill or storage facility at a given time versus the predicted number, the actual number of trucks in transport to or from each field at a given time versus the predicted number, the actual geospatial location of all equipment at a given time versus the predicted location. This includes only a small number of examples of the types of comparisons that can be made.

The difference in the compared values is the error 228 relative to the modeled performance. This can be stored in data store 208 for later playback, or it can be provided to decision support system 204 in near real time.

In one embodiment, the error information 228 is simply stored in data store 208 unless it exceeds a predetermined (or dynamically determined) threshold value. This is indicated by block 294. By way of example, if the queue at the mill is getting too long (e.g., if the wait time exceeds a threshold value), that may indicate that the harvesters should slow down and conserve fuel. This is but one example only. In any case, if the error does exceed a predetermined value, then it can be provided to decision support system 204 which generates actionable recommendations or adjustments that can be made by manger system 210 to modify the operation of the worksite operations 216 to more closely conform to the modeled operation (e.g., to improve performance). This is indicated by block 296. This allows operations manager system 210 to operate on an exception basis, instead of using continuous monitoring. It will be appreciated, however, that continuous monitoring can be used as well.

The recommendations 222 can be output to manager 212, using user interface displays 214, or in other ways. The outputs can be calculated using a wide variety of different techniques. For instance, the outputs can be generated using line balancing 298. A number of examples of line balancing are shown below with respect to FIGS. 6-9. The outputs can be generated using a variety of heuristics 300. They can also be generated by accessing a set of best practices which indicate adjustments that should be made under certain circumstances. This is indicated by block 302. The can include specific machine operation changes, such as changing the settings, speed, etc. of one or more machines in a given field operations architecture. This is indicated by block 304. They can include recommendations regarding logistics 306 or scheduled maintenance 308. For instance, if decision support system 204 identifies that a harvester will need to stop, based upon a delay in access to billet wagons, then the maintenance for the harvester may be scheduled to occur during its downtime.

The outputs can be generated to indicate asset, resource or labor allocations. This is indicated by block 310. The outputs can identify a host of other things as well, and this is indicated by block 312.

Manager system 210 then makes adjustments to the control parameters (the management and control outputs) 226 based upon the generated recommendations and adjustments 222. This is indicated by block 314. For instance, the management system 210 can automatically change maintenance schedules. In addition, the management system can wait for manager 212 to manually change those schedules, etc.

Management and control system 152 continues this operation until the harvesting is complete. This is indicated by block 316. If it is not complete, then processing continues.

It may be that, during the operations, some type of disturbance 230 is input into the worksite operations 216. This is indicated by blocks 320 and 322. The disturbances may be changing weather conditions, a machine failure, a slow down at the mill for one of a variety of reasons, or it can include a wide variety of other disturbances. These disturbances can be sensed and input to model 200 at the same time that they occur, or in near real-time. This is indicated by block 318. They can also be input to the model 200 manually. In any case, receiving disturbances into the system is indicated by block 322.

Model 200 then generates a new response based upon the work objectives, the adjustments to the control parameters 226 and the disturbances 230. This is indicated by block 324. Processing then reverts back to block 282 where the sensed operations data 218 is received from the worksite operations, and the closed loop control continues.

Figure 6:
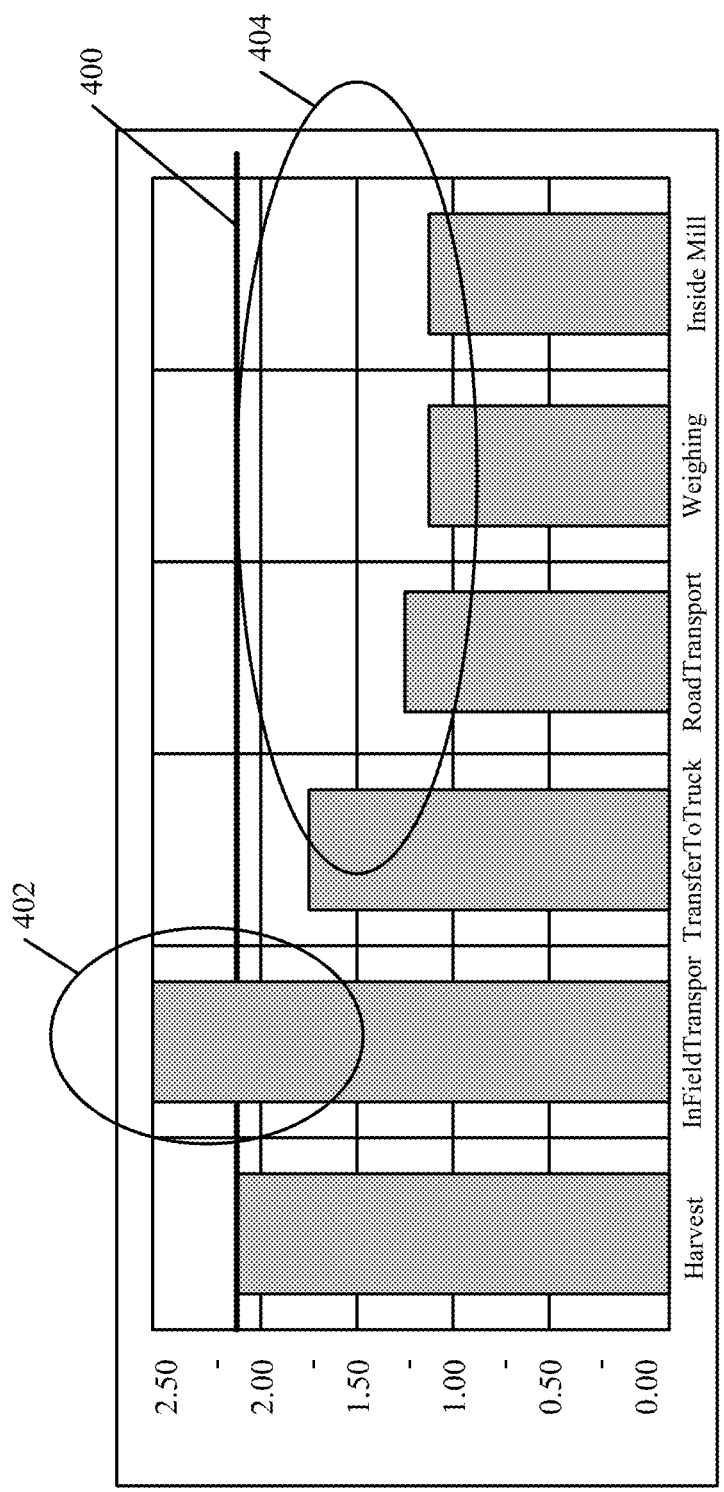
FIG. 6 shows one example of a management and control user interface display that can be generated with a line-balancing graph.
Figure 7:
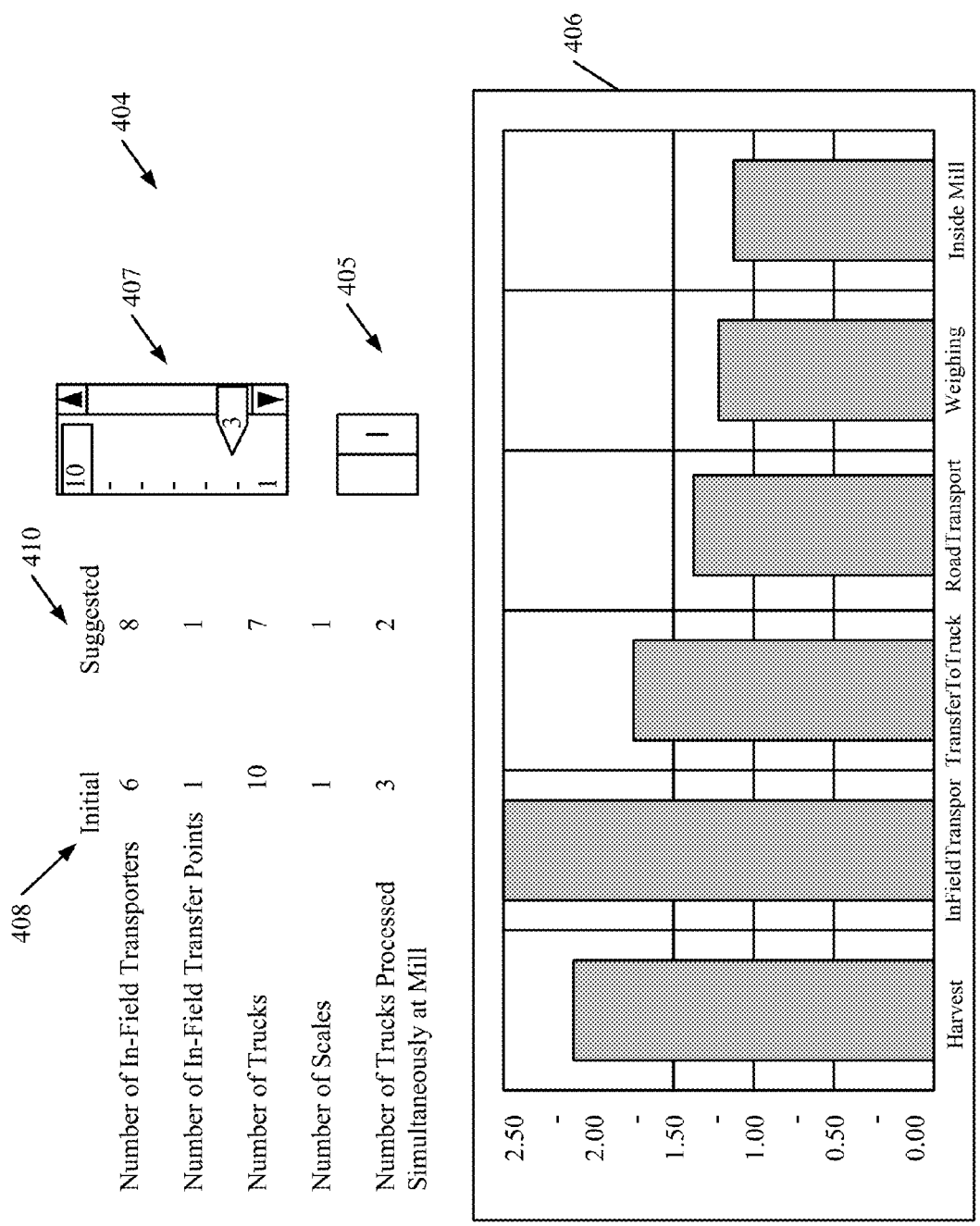
FIG. 7 shows one embodiment of a management and control user interface display.

FIGS. 6 and 7 show an example in which decision support system 204 generates recommendations 222 using line balancing. In the example shown in FIG. 6, a plurality of subsystems in a field operations architecture are indicated along the x-axis of the bar chart. These include harvest, in-field transport, transfer to the road transport system, road transport, weighing and operations inside the mill. The y-axis indicates a volume of product per unit time (in this case, tons per hour). For the system to be operating as desired, all of the subsystems are processing the harvested product at the same rate. Model 200 generates the target line 400. Therefore, all of the bar charts will be precisely at the level of line 400 shown in FIG. 6. This is because all of the subsystems will be moving the product at the same mass flow rate throughout the entire architecture, and the target mass flow rate indicated by line 400 is that for the simulated system, as generated by model 200.

In another embodiment, the y-axis can be normalized to cycle times in minutes. For instance, the y-axis can represent the cycle time of moving a given mass of harvested product through the subsystem. Again, for the system to operate with high performance, all of the subsystems will have an equal cycle times.

FIG. 6 shows an example of a display that can be generated, for instance, prior to management and control system 152 generating the recommendations or adjustments. It can be seen in FIG. 6 that the in-field transport subsystem 114 is creating a bottleneck. This is because the portion of the bar chart corresponding to the in-field transport system 114 (and generally indicated at 402) exceeds line 400. This means that it is taking longer for the in-field transport system 114 to transport the same mass of harvested product than it is any of the other subsystems. FIG. 6 also shows that all of the subsystems downstream of the in-field transport system 114 are then waiting. This is indicated generally by the area outlined at 404.

FIG. 7 shows one example of a user interface display 404 that can be generated by operations manager system 210 to show the outputs generated by management and control system 152. Display 404 illustratively includes the chart 406 shown in FIG. 6. The chart thus indicates overall system performance. In addition, it shows the current resource allocation illustrated generally at 408. It also shows a suggested resource allocation illustrated generally at 410. The suggested resource allocation reflects the recommended adjustments to the operations that will make the bars in the bar chart 406 closer to the modeled value 400.

In the embodiment shown in FIG. 7, for instance, it can be seen that the resources are currently allocated with six in-field transporters, ten trucks, one scale and it also indicates that the number of trucks processed simultaneously at the mill is three. Because graph 406 shows that the in-field transportation subsystem 114 is creating a bottleneck, it can be seen that decision support system 204 has generated a recommendation or suggestion (shown generally at 410) to increase the number of in-field transporters from six to eight and to decrease the number of trucks from ten to seven.

In one embodiment, the suggestions shown generally at 410 can be made based on a rolling average of system performance. Therefore, if the system performance is degraded for only a short period of time, the suggestions may not be appropriate. However, by averaging the operations performance over some period of time (for example, an hour), this can provide a more likely indication that an adjustment should be made.

In the example embodiment shown in FIG. 7, user interface display 404 also illustratively includes a switch 405 that can be actuated by manager 212 to implement the suggested changes. In that case, operations manager system 210 will automatically generate an output 226 reallocating the resources as suggested at 410.

Similarly, user interface display 404 illustratively includes a harvester selection user input mechanism 407. This allows manager 210 to increase or decrease the number of harvesters and have model 200 simulate and display how that would affect the suggestions shown generally at 410.

Figure 8:
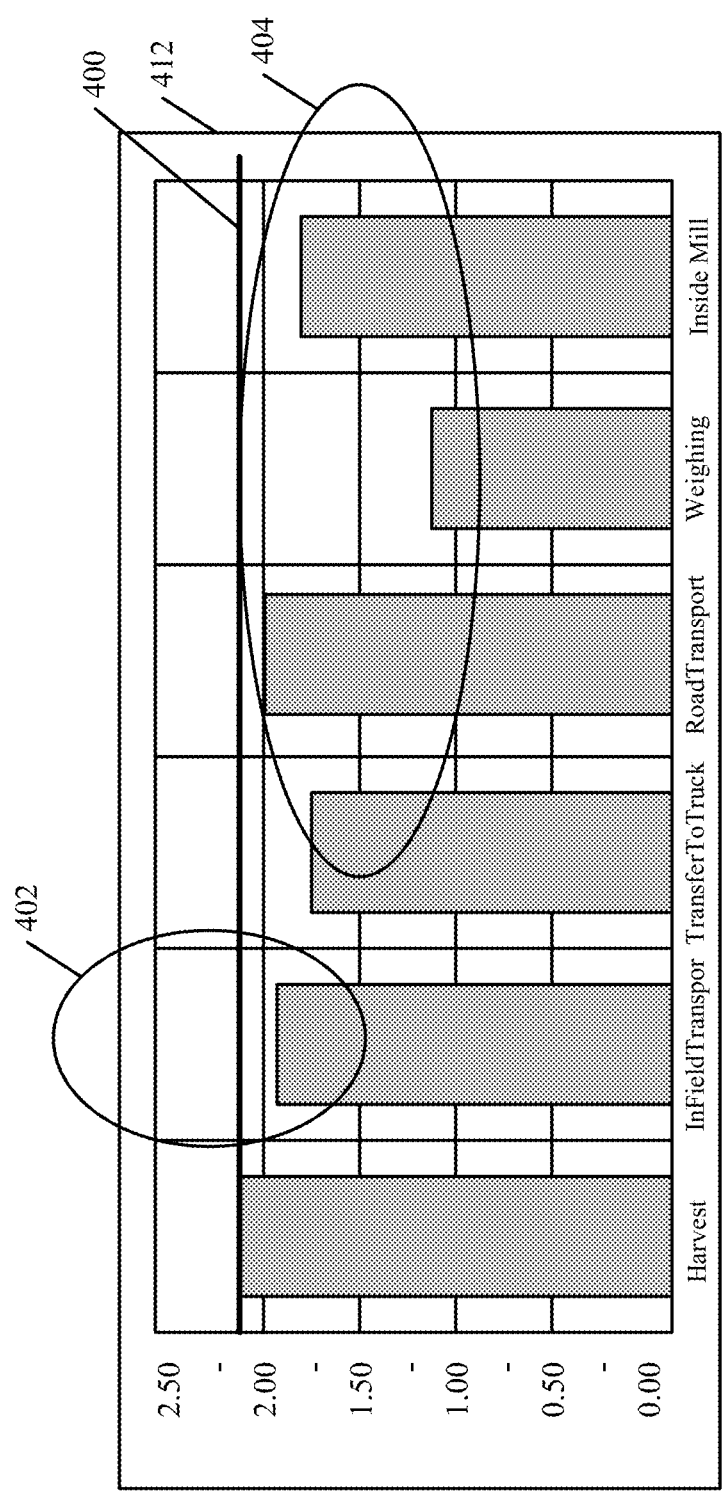
FIG. 8 shows one embodiment of a line-balancing graph after adjustments are made.

FIG. 8 shows an example of a line-balance chart 412 that is generated after the suggestions have been implemented. It can be seen that the bottleneck at 402 has been substantially eliminated, and the wait times indicated generally at 404 have been much improved. The user interface display can then be generated showing the modified line-balancing graph 406.

The present discussion has mentioned processors and/or servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
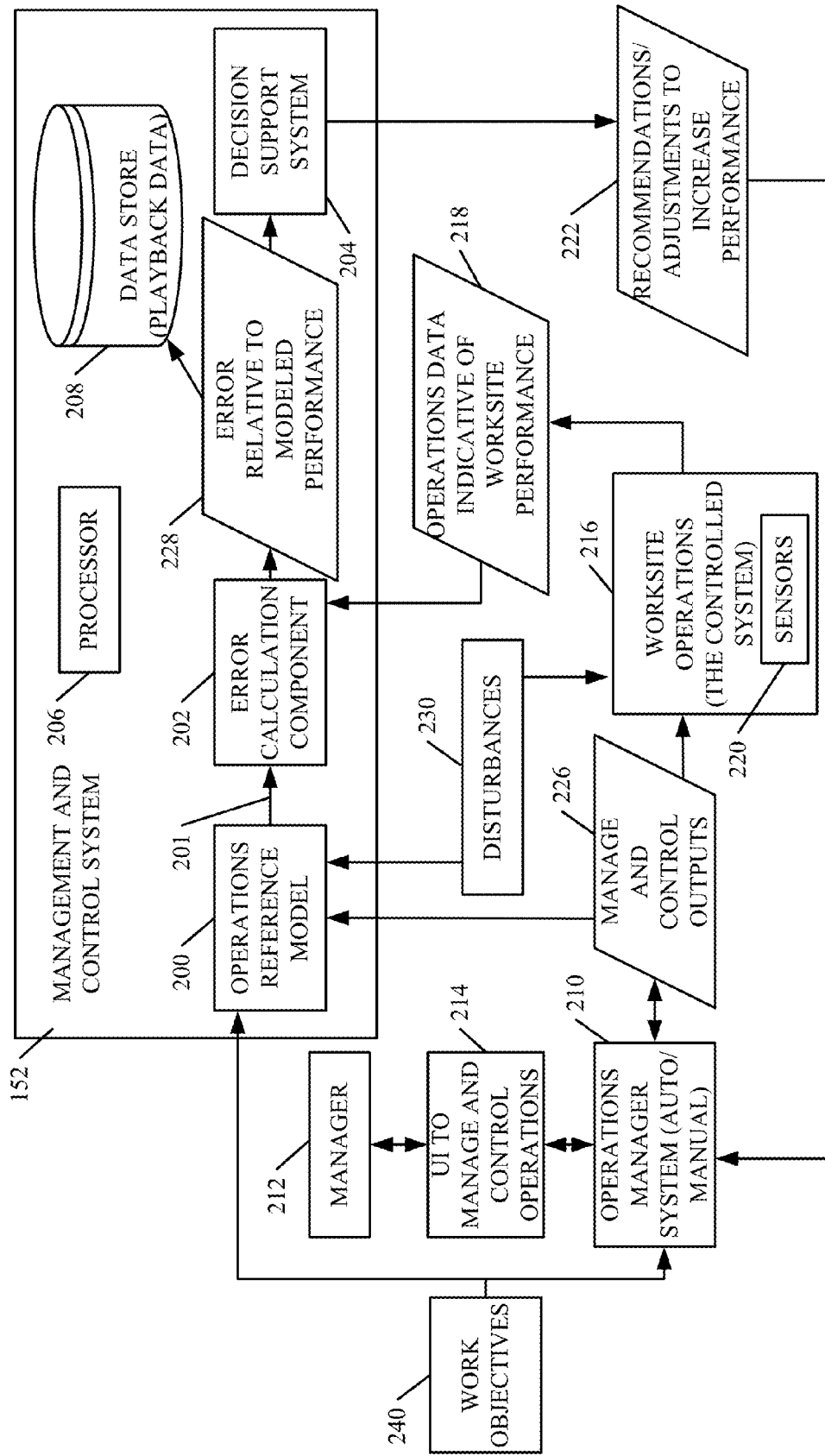
FIG. 4 is a block diagram of one example of a management and control system.

It will also be noted that the elements of FIG. 3 or 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
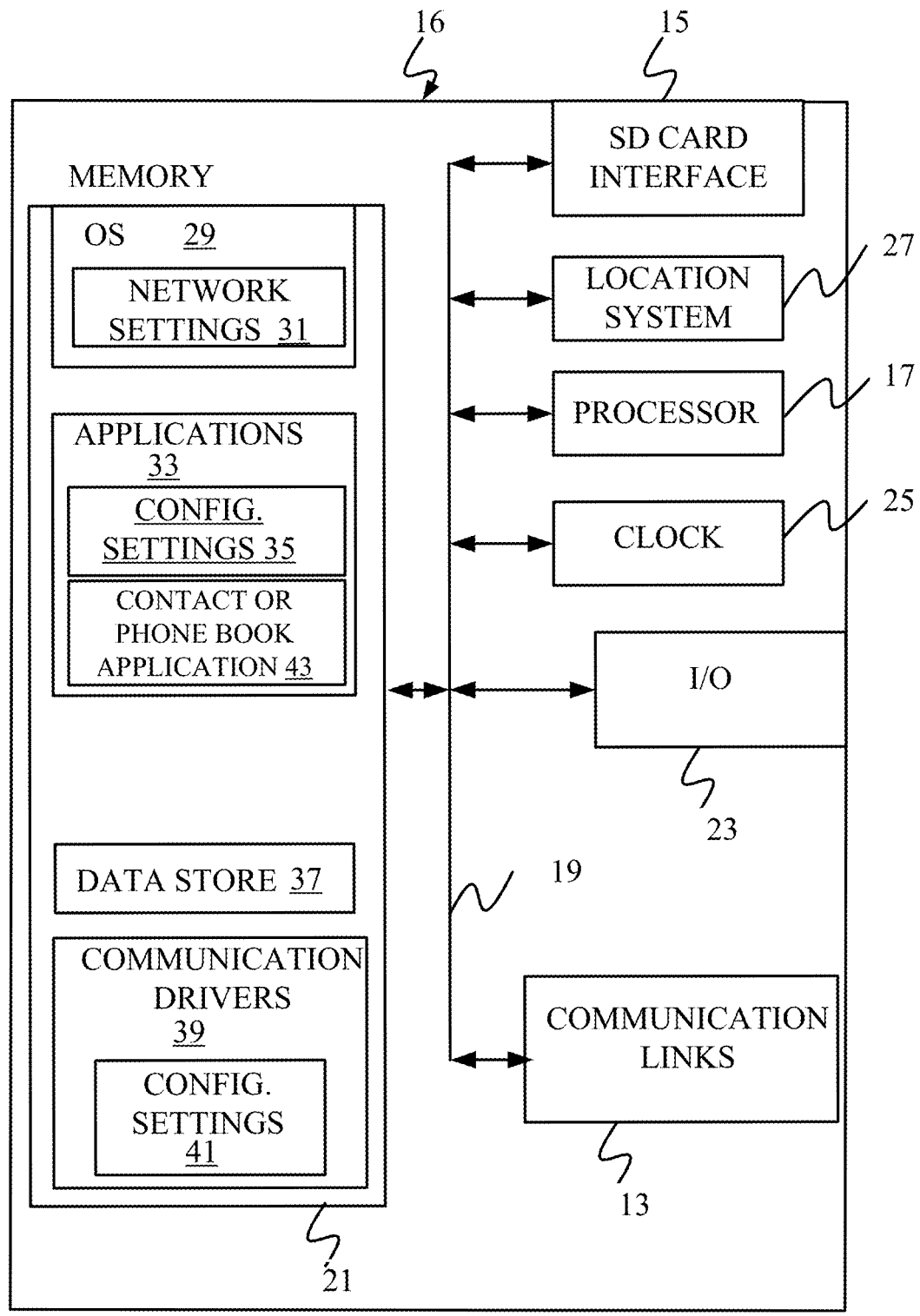
FIG. 9 shows one embodiment of a computing environment.

FIG. 9 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of the harvesters, trucks, tractors or at the mills or storage facilities. It can also be deployed in the service truck.

FIG. 9 provides a general block diagram of the components of a client device 16 that can run some components shown in FIGS. 3-4, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Note that other forms of the devices 16 are possible.

Figure 10:
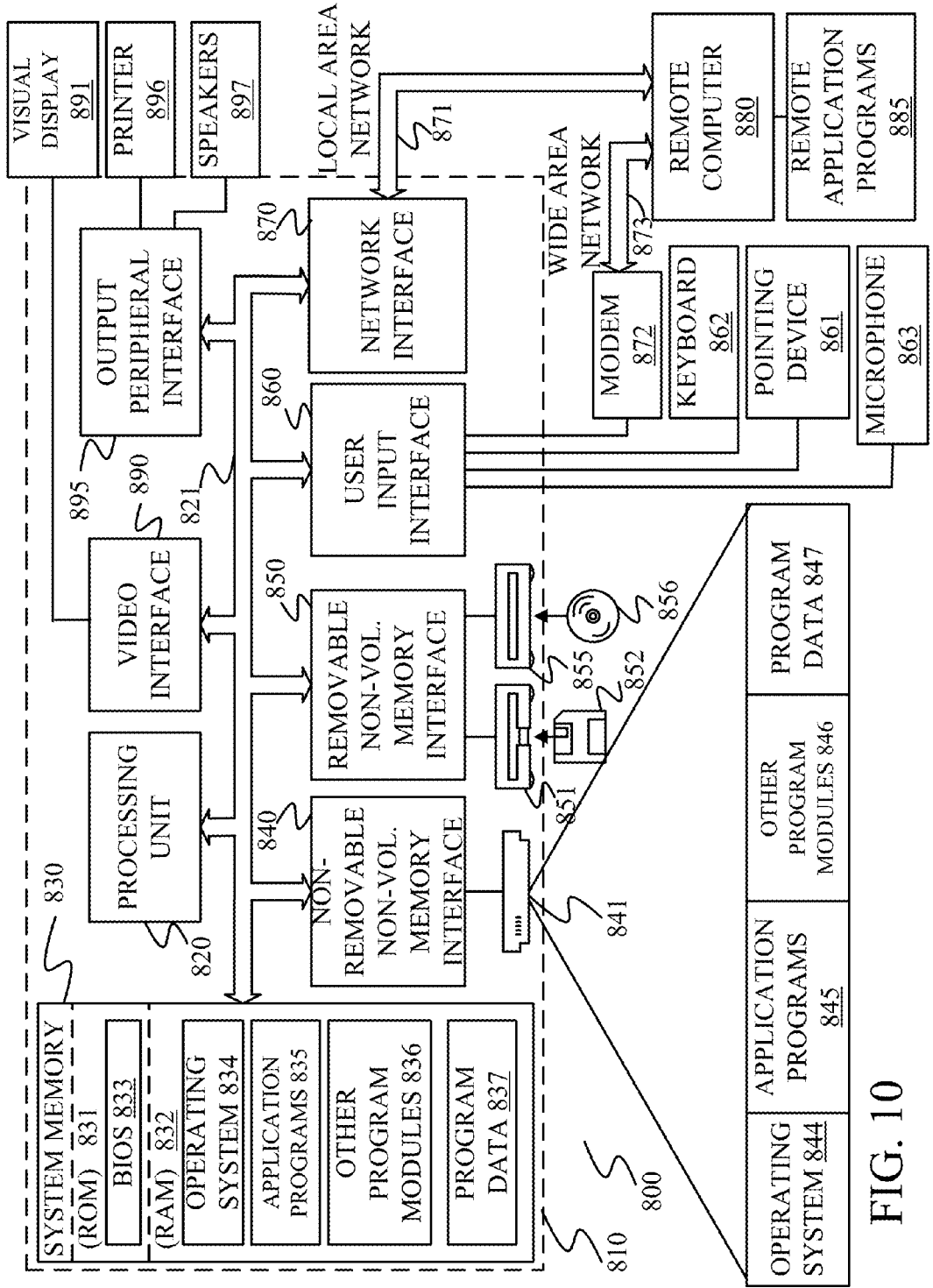
FIG. 10 shows another embodiment of a computing environment.

FIG. 10 is one embodiment of a computing environment in which elements of FIGS. 3-4, or parts of them, (for example) can be deployed. With reference to FIG. 10, an example system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 3-4 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
   receiving worksite objectives for concurrently operating a plurality of different worksites;
   using a computer-implemented model generator to generate a reference model that provides a model output indicative of modeled operation of the plurality of different worksites; and
   generating control signals to perform closed loop, near real time control of the operation of the plurality of different worksites using the reference model, comprising:
   receiving operations data through a communication system indicative of an actual worksite performance;
   comparing the operations data to the reference model and generating an error output using a computer-implemented error calculation component;
   comparing the error output to a threshold; and
   generating the control signals based at least in part on the comparison between the error output and the threshold;
   generating a recommended adjustments output indicative of adjustments to the plurality of different worksites based on the comparison of the error output to the threshold using a computer-implemented decision support system; and
   generating the control signals based at least in part on the generated recommended adjustments output.

2. The computer-implemented method of claim 1 wherein receiving worksite objectives comprises receiving a desired worksite output indicative of a quantity of material per unit time.

3. The computer-implemented method of claim 1 further comprising:
   receiving a disturbance input indicative of a disturbance to the worksite operations; and
   wherein generating the reference model is based at least in part on the disturbance input.

* * * * *